(12) United States Patent
MacPherson

(10) Patent No.: US 7,505,029 B2
(45) Date of Patent: Mar. 17, 2009

(54) SYSTEM AND METHOD FOR CONTROLLING MULTIPLE PROCESSING UNITS WITH A SINGLE INPUT DEVICE

(75) Inventor: Mike B. MacPherson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 748 days.

(21) Appl. No.: 10/335,193

(22) Filed: Dec. 31, 2002

(65) Prior Publication Data
US 2004/0125084 A1 Jul. 1, 2004

(51) Int. Cl.
G09G 5/00 (2006.01)
(52) U.S. Cl. .................... 345/156; 345/204
(58) Field of Classification Search .......... 345/156, 345/157, 501–506, 168, 163, 204; 709/208–211; 700/2–4
See application file for complete search history.

(56) References Cited

U.S. PATENT DOCUMENTS

| | | | |
|---|---|---|---|
| 5,265,201 A * | 11/1993 | Cabot et al. | 345/504 |
| 5,337,410 A * | 8/1994 | Appel | 345/501 |
| 6,378,014 B1 * | 4/2002 | Shirley | 710/100 |
| 6,507,760 B1 * | 1/2003 | Baumgartner | 700/2 |
| 6,609,034 B1 * | 8/2003 | Behrens et al. | 700/19 |
| 2003/0215114 A1 * | 11/2003 | Kyle | 382/115 |
| 2004/0093391 A1 * | 5/2004 | Chen | 709/217 |
| 2004/0226041 A1 * | 11/2004 | Smith et al. | 725/43 |

* cited by examiner

Primary Examiner—Ricardo L Osorio
(74) Attorney, Agent, or Firm—Schwegman, Lundberg & Woessner, P.A.

(57) ABSTRACT

An apparatus and system transfer control of an input device from one processor to another processor in a distributed computing system when a pointer is located within a transition area of a display. Movement of the input device triggers the transfer of input signals generated by the input device to the other processor. In one embodiment, the input device includes a keyboard and mouse.

13 Claims, 10 Drawing Sheets

| TRANSITION-AREA \ PROCESSING UNIT | PROCESSING UNIT 1 | PROCESSING UNIT 2 | PROCESSING UNIT 3 | PROCESSING UNIT 4 | PROCESSING UNIT 5 |
|---|---|---|---|---|---|
| LEFT | PROCESSING UNIT 5 | X | PROCESSING UNIT 1 | X | X |
| RIGHT | PROCESSING UNIT 3 | X | X | X | PROCESSING UNIT 1 |
| TOP | PROCESSING UNIT 2 | X | X | PROCESSING UNIT 1 | X |
| BOTTOM | PROCESSING UNIT 4 | PROCESSING UNIT 1 | X | X | X |

*FIG. 7*

| PROCESSING UNIT / TRANSITION-AREA | PROCESSING UNIT 1 | PROCESSING UNIT 2 | PROCESSING UNIT 3 | PROCESSING UNIT 4 | PROCESSING UNIT 5 |
|---|---|---|---|---|---|
| LEFT | PROCESSING UNIT 5 | X | PROCESSING UNIT 1 | X | PROCESSING UNIT 3 |
| RIGHT | PROCESSING UNIT 3 | X | PROCESSING UNIT 5 | X | PROCESSING UNIT 1 |
| TOP | PROCESSING UNIT 2 | PROCESSING UNIT 4 | X | PROCESSING UNIT 1 | X |
| BOTTOM | PROCESSING UNIT 4 | PROCESSING UNIT 1 | X | PROCESSING UNIT 2 | X |

*FIG. 8*

SYSTEM AND METHOD FOR CONTROLLING MULTIPLE PROCESSING UNITS WITH A SINGLE INPUT DEVICE

FIELD

Embodiments of the invention are related to a multiple processing unit system, and more particularly to a system and method for controlling multiple processing units with a single input device.

BACKGROUND

The need for more effective and versatile computing environments continually grows as technology evolves and as users' demands increase. Today, more and more users have computing environments with multiple processors, and sometimes even with multiple displays as well. These users may want to utilize the shared resources of their computing environments in an easy fashion, such that their needs are met with ease and comfort.

Most processors and displays today support input devices, such as a keyboard and mouse. These input devices send input signals to the processor, and the processor's response to the input signals is displayed on the display. Many of these processors and displays, however, support only a local input device connection, such that the input device only has the capability to control the processor and display to which it is directly connected. This limitation undercuts the goal of optimizing efficiency and effectiveness of a multi-processor or multi-display distributed computing system. Users often do not want to connect input devices to each processor in their system due to cost and space considerations.

Some existing systems allow users to use a single input device and a single processor with different displays. In these systems, the single input device is connected to the single processor, and the single processor is connected to multiple displays. There are other existing systems that allow users to use a single input device with different processors, but these systems require either a hardware switch (e.g. a keyboard-video-mouse, or KVM, switch) or a key depression (for example, on a keyboard) for input to be manually switched from one processor to the next.

For these and other reasons, there is a need for embodiments of the present invention.

BRIEF DESCRIPTION OF THE DRAWINGS

FIG. 7 is a detailed view of a display map for determining a next processing unit according to one embodiment of the invention.

FIG. 8 is a detailed view of a display map for determining a next processing unit according to another embodiment of the invention.

DETAILED DESCRIPTION

In the following detailed description of the embodiments of the invention, reference is made to the accompanying drawings which form a part hereof, and in which is shown by way of illustration specific preferred embodiments. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
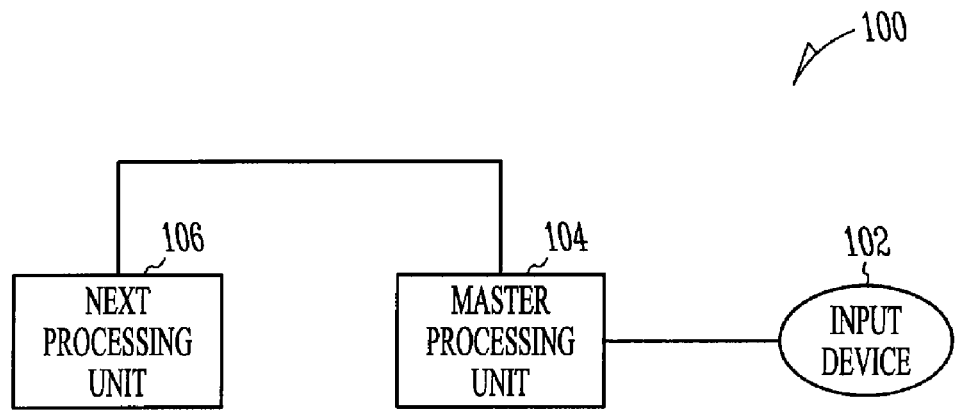
FIG. 1 is a block diagram of a system for controlling multiple processing units with a single input device according to one embodiment of the invention.

FIG. 1 is a block diagram of a system for controlling multiple processing units with a single input device according to one embodiment of the invention. In this embodiment, a system 100 includes an input device 102, a master processing unit 104, and a next processing unit 106. The input device 102 is coupled to the master processing unit 104, and the master processing unit 104 is additionally coupled to the next processing unit 106. A master processing unit refers to a processing unit that is coupled to an input device.

The input device 102 is any device operated by a user that provides data to a computer or computer system. Embodiments of the invention are not limited to a particular type of input device. In one embodiment, the input device 102 is a mouse. In other embodiments, the input device 102 is a mouse and a keyboard. In still other embodiments, the input device is a trackball, a trackpad or touchpad, a joystick, or the like.

The input device 102 initially controls input operations on the master processing unit 104. Input signals generated by the input device 102 are transmitted to the master processing unit 104. Control of the input device 102 is switched between the master processing unit 104 and the next processing unit 106 based on movement of the input device 102.

In some embodiments, the system 100 further includes a display. In these embodiments, the master processing unit 104 is coupled to the display. The display presents output from the master processing unit 104 and the next processing unit 106. In other embodiments, the system 100 further includes a first display and a second display. In these embodiments, the master processing unit 104 is coupled to the first display and the next processing unit 106 is coupled to the second display. The first display presents output from the master processing unit 104 and the second display presents output from the next processing unit 106.

Figure 2:
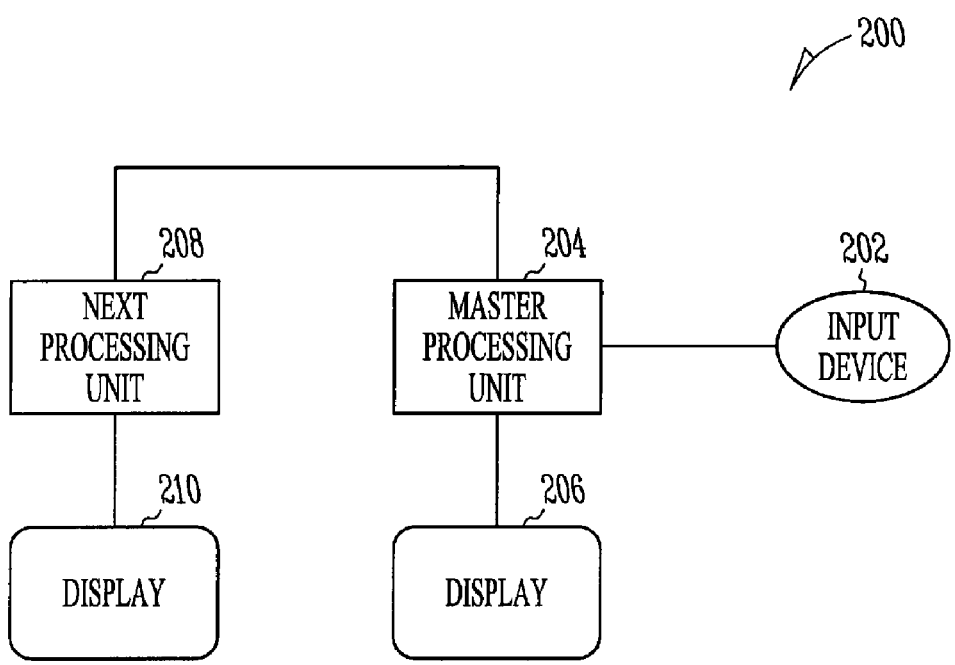
FIG. 2 is a block diagram of a system for controlling multiple processors and displays with a single input device according to another embodiment of the invention.

FIG. 2 is a block diagram of a system for controlling multiple processors and displays with a single input device according to another embodiment of the invention. In this embodiment, a system 200 includes input device 202, master processing unit 204, first display 206, next processing unit 208, and second display 210. The first display 206 is operatively coupled to the master processing unit 204. The second display 210 is operatively coupled to the next processing unit 208. The first display 206 presents output from the master processing unit 204, and the second display 210 presents output from the next processing unit 208. In one embodiment, the next processing unit 208 is operatively coupled to the master processing unit 204 through any available network connection (such as an Ethernet connection), and the master processing unit 204 is operatively coupled to the input device 202.

At start-up of the system 200, the input device 202 sends input signals to the master processing unit 204. These input signals trigger movement of a pointer on the first display 206. In this fashion, the input device 202 controls the movement of the pointer. Embodiments of the invention are not limited to a particular type of pointer. In a graphical user interface, a pointer is a small arrow or any other symbol on the display screen that moves as a user moves an input device (such as a mouse, a trackpad, or the like). In an alternate embodiment, such as in a text processing program, the pointer is an I-beam pointer.

In one embodiment, the first display 206 includes right, left, upper, and lower transition areas. In operation, according to one embodiment, the master processing unit 204 detects when the pointer is located in the left transition area of the first display 206. When this event is detected, the master processing unit 204 reads a first display map to determine that subsequent input generated by the input device is to be forwarded to the next processing unit 208 (which is located to the left of the master processing unit 204, as shown in FIG. 2). One or more input signals from the input device 202 are thereby transferred, and control of operation switched, to the next processing unit 208. The input signals from the input device 202 that are forwarded to the next processing unit 208 trigger movement of a second pointer on the second display 210. The next processing unit 208 later detects when the second pointer on the second display 210 is located in the right transition area of the second display 210. When this occurs, the next processing unit 208 reads a second display map to determine that subsequent input generated by the input device is to be forwarded back to the master processing unit 204 (which is located to the right of the next processing unit 208, as shown in FIG. 2). One or more input signals from the input device 202 is thereby transferred back to the master processing unit 204 from the next processing unit 208.

Figure 3:
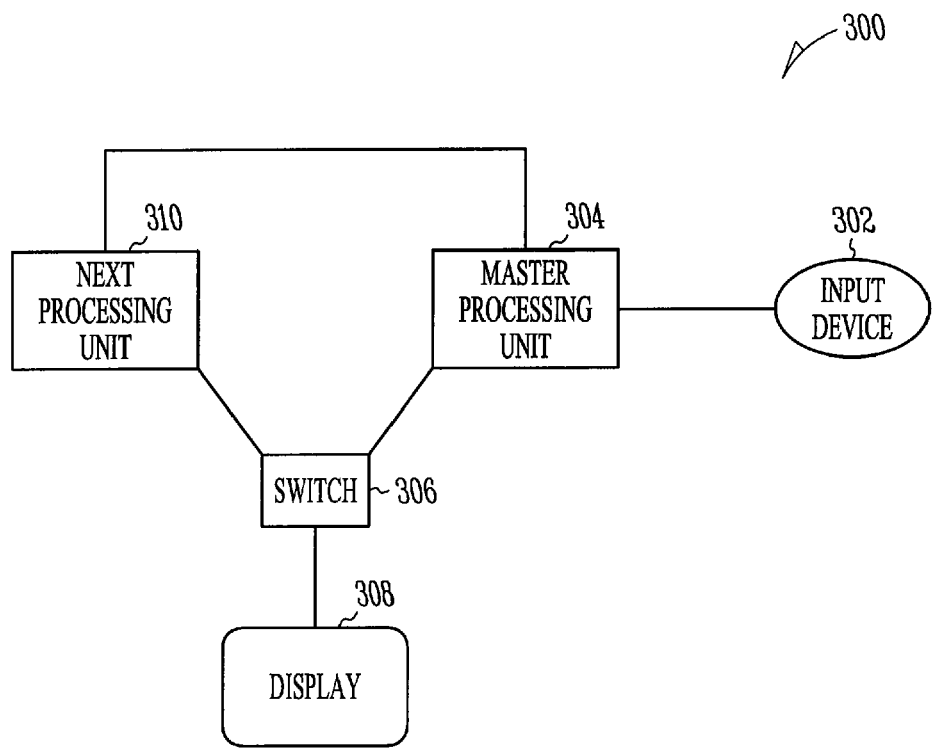
FIG. 3 is a block diagram of a system for controlling multiple processors and a single display with a single input device according to an alternate embodiment of the invention.

FIG. 3 is a block diagram of a system for controlling multiple processors and a single display with a single input device according to an alternate embodiment of the invention. A system 300 includes input device 302, master processing unit 304, next processing unit 310, display switch 306, and display 308. The input device 302 is operatively coupled to the master processing unit 304. The display 308 is operatively coupled to the display switch 306. The master processing unit 304 is operatively coupled to the next processing unit 310. The display switch 306 is operatively coupled to each of the master processing unit 304, the next processing unit 310, and the display 308.

In this example embodiment, the input device 302 controls a pointer on the display 308 that moves in two or more directions, including the left, right, upper, and lower directions. The display 308 includes two or more transition areas, such as a left, a right, an upper, and a lower transition area. Control is switched between the master processing unit 304 and the next processing unit 310 based on movement of the input device 302. The master processing unit 304 transfers one or more input signals from the input device 302 to the next processing unit 310 when the pointer controlled by the input device 302 is located in a transition area of the display 308. In addition, the display switch 306 is toggled when the pointer is located within the transition area of the display 308. When the display switch 306 is toggled, control of the display 308 is switched between processing units. Thus, when the display switch 306 is toggled to a first position, the display 308 is controlled by the master processing unit 304, wherein output from the master processing unit 304 is sent to the display 308. When the display switch 306 is toggled to a second position, the display 308 is controlled by the next processing unit 310, wherein output from the next processing unit 310 is sent to the display 308. In some embodiments, the display switch 306 is a hardware-based video switch.

Figure 4:
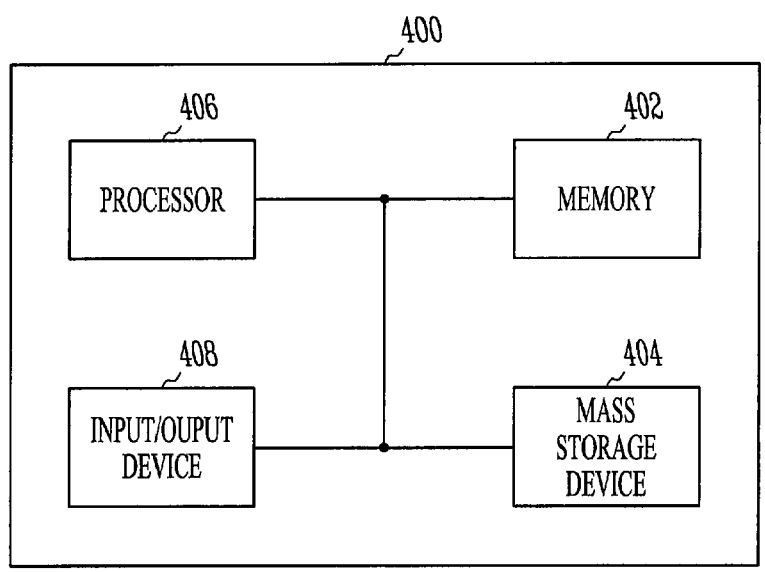
FIG. 4 is a block diagram of an apparatus according to one embodiment of the invention.

FIG. 4 is a block diagram of an apparatus according to one embodiment of the invention. In this embodiment, an apparatus 400 includes a processor 406, a memory 402, an input/output device 408, and a mass storage device 404, each coupled to one another. The input/output device 408 has many functions, including providing input signals to the processor 406. The mass storage device 404 includes a machine-accessible medium. The machine-accessible medium has machine-executable instructions stored thereon. In one embodiment, the machine-executable instructions are executed by the processor 406 from the memory 402 to control two or more processing units from the input/output device 408 based on movement of the input/output device 408 in a two-dimensional manner. In one embodiment, the input/output device 408 includes a mouse that moves in two dimensions.

Figure 5:
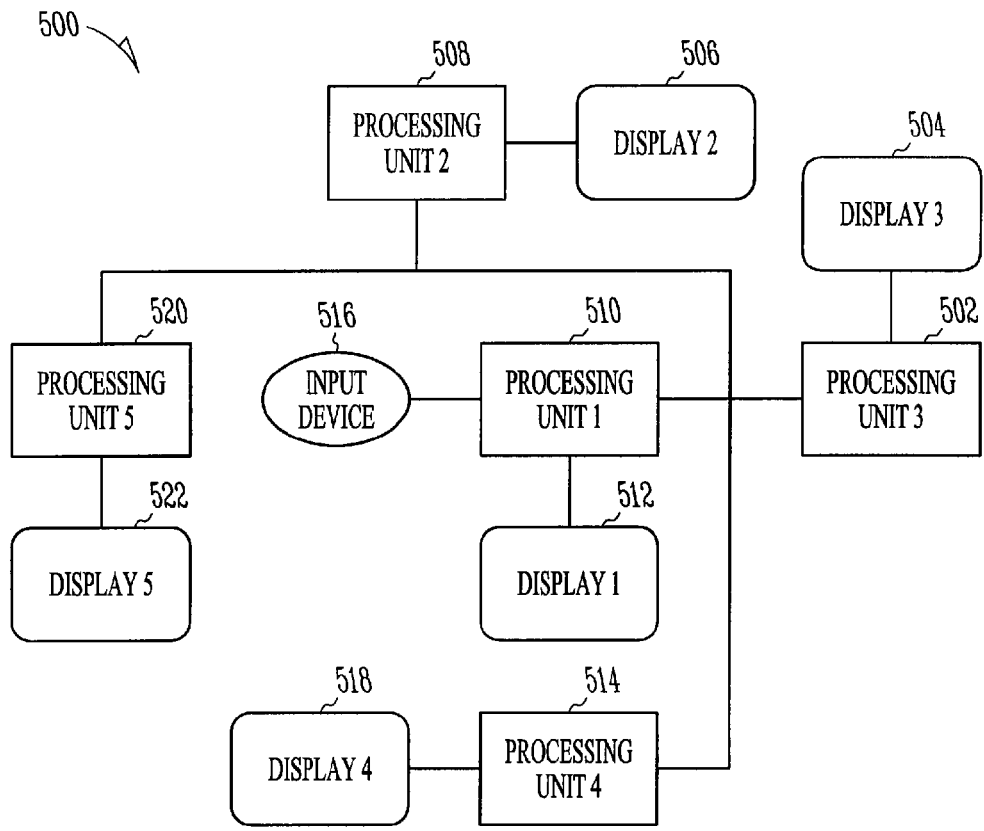
FIG. 5 is a block diagram of a system for controlling multiple processors and displays with a single input device according to another embodiment of the invention.

FIG. 5 is a block diagram of a system for controlling multiple processors and displays with a single input device according to another embodiment of the invention. In this embodiment, a system 500 includes input device 516, first processing unit 510 (Processing Unit$_1$), first display 512 (Display$_1$), second processing unit 508 (Processing Unit$_2$), second display 506 (Display$_2$), third processing unit 502 (Processing Unit$_3$), third display 504 (Display$_3$), fourth processing unit 514 (Processing Unit$_4$), fourth display 518 (Display$_4$), fifth processing unit 520 (Processing Unit$_5$), and fifth display 522 (Display$_5$).

In one embodiment, the first processing unit 510 is a master processing unit because it is operatively coupled to the input device 516. The first display 512 is operatively coupled to the first processing unit 510. The second display 506 is operatively coupled to the second processing unit 508. The third display 504 is operatively coupled to the third processing unit 502. The fourth display 518 is operatively coupled to the fourth processing unit 514. The fifth display 522 is operatively coupled to the fifth processing unit 520. The first processing unit 510, the second processing unit 508, the third processing unit 502, the fourth processing unit 514, and the fifth processing unit 520 are operatively coupled to one another.

Figure 6:
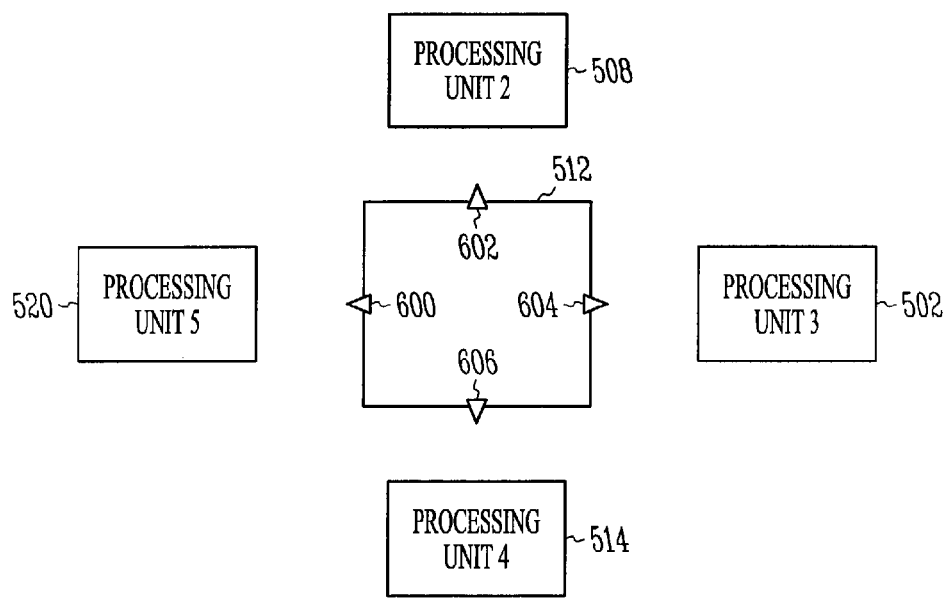
FIG. 6 is a detailed view of transition areas on a display according to one embodiment of the invention.

In operation, the input device 516 transmits input signals to the first processing unit 510 and controls movement of a pointer on the first display 512. When the first processing unit 510 detects that the pointer is located in a transition area of the first display 512, the first processing unit 510 forwards subsequent input signals of the input device 516 to a next processing unit (which will be either the second processing unit 508, the third processing unit 502, the fourth processing unit 514, or the fifth processing unit 520). FIGS. 6-8 illustrate how the first processing unit 510 determines which processing unit is the next processing unit according to various embodiments.

FIG. 6 is a detailed view of transition areas on a display according to one embodiment of the invention. A transition area is any location or area on the display that is defined by an operating system, an application program, or a user. When a pointer is detected in the transition area, control is transferred to a next processing unit. Embodiments of the invention are not limited to any particular size, shape or location on a display for a transition area. In one embodiment, the area near each edge of the display defines a transition area.

The input device 516 (shown in FIG. 5) controls movement of the pointer on the first display 512. As shown in FIG. 6, the first display 512 includes a top transition area at the top of the display, a bottom transition area at the bottom of the display, a right transition area at the right side of the display, and a left transition area at the left side of the display. In one embodiment, if pointer is in a top location 602, then the pointer is in the top transition area. In another embodiment, if pointer is in a right location 604, then it is in the right transition area. In still another embodiment, if pointer is in bottom location 606, then it is in the bottom transition area. In a further embodiment, if pointer is in a left location 600, then it is in the left transition area. When the pointer is located within any of the transition areas of first display 512, first processing unit 510 searches a display map to determine the next processing unit that will receive subsequent input signals from the input device 516.

FIG. 7 is a detailed view of a display map for determining a next processing unit according to one embodiment of the invention. A display map 700 includes a plurality of control processing unit indexes, one or more display transition-area indexes, and one or more next processing unit entries that are each referenced by one of the control processing unit indexes and one of the display transition-area indexes. In this example embodiment, columns are indexed by a processing unit 712, and rows are indexed by a transition area 714. The column indexes correspond to the processing unit having current control from the input device 516 (i.e. receiving current input signals from the input device 516). The display map 700 includes a first column index 710 for the first processing unit 510 (Processing Unit$_1$), a second column index 708 for the second processing unit 508 (Processing Unit$_2$), a third column index 706 for the third processing unit 502 (Processing Unit$_3$), a fourth column index 704 for the fourth processing unit 514 (Processing Unit$_4$), and a fifth column index 702 for the fifth processing unit 520 (Processing Unit$_5$). The display map 700 also includes a first row index 716 for a left transition area of the first display 512, a second row index 718 for a right transition area of the first display 512, a third row index 720 for a top transition area of the first display 512, and a fourth row index 722 for a bottom transition area of the first display 512.

When the pointer is in the top location 602 (as shown in FIG. 6), it is located in the top transition area of the first display 512. When the first processing unit 510 searches the display map 700 to determine the next processing unit, it uses the first column index 710 (for the current processing unit), and the third row index 720 (for the top transition area) to locate the entry in the display map 700 corresponding to the next processing unit. As shown in FIG. 7, the first column index 710 and the third row index 720 contain an entry for Processing Unit$_2$ (the second processing unit 508). This entry in the display map 700 informs the first processing unit 510 that the second processing unit 508 is the next processing unit, and the first processing unit 510 is then able to forward subsequent input signals from the input device 516 to the second processing unit 508 when the pointer in the top location 602 is located in the top transition area of the first display 512.

When the pointer is in the right location 604 (as shown in FIG. 6), it is located in the right transition area of the first display 512. When the first processing unit 510 searches the display map 700 to determine the next processing unit, it uses the first column index 710 (for the current processing unit), and the second row index 718 (for the right transition area) to locate the entry in the display map 700 corresponding to the next processing unit. As shown in FIG. 7, the first column index 710 and the second row index 718 reference an entry for Processing Unit$_3$ (the third processing unit 502). This entry in the display map 700 informs the first processing unit 510 that the third processing unit 502 is the next processing unit, and the first processing unit 510 is then able to forward subsequent input signals from the input device 516 to the third processing unit 502 when the pointer in the right location 604 is located in the right transition area of the first display 512.

When the pointer is in the bottom location 606 (as shown in FIG. 6), it is located in the bottom transition area of the first display 512. When the first processing unit 510 searches the display map 700 to determine the next processing unit, it uses the first column index 710 (for the current processing unit), and the fourth row index 722 (for the bottom transition area) to locate the entry in the display map 700 corresponding to the next processing unit. As shown in FIG. 7, the first column index 710 and the fourth row index 722 reference an entry for Processing Unit$_4$ (the fourth processing unit 514). This entry in the display map 700 informs the first processing unit 510 that the fourth processing unit 514 is the next processing unit, and the first processing unit 5 10 is then able to forward subsequent input signals from the input device 516 to the fourth processing unit 514 when the pointer in the bottom location 606 is located in the bottom transition area of the first display 512.

When the pointer is in the left location 600 (as shown in FIG. 6), it is located in the left transition area of the first display 512. When the first processing unit 510 searches the display map 700 to determine the next processing unit, it uses the first column index 710 (for the current processing unit), and the first row index 716 (for the left transition area) to locate the entry in the display map 700 corresponding to the next processing unit. As shown in FIG. 7, the first column index 710 and the first row index 716 reference an entry for Processing Unit$_5$ (the fifth processing unit 520). This entry in the display map 700 informs the first processing unit 510 that the fifth processing unit 520 is the next processing unit, and the first processing unit 510 is then able to forward subsequent input signals from the input device 516 to the fifth processing unit 520 when the pointer in the left location 600 is located in the left transition area of the first display 512.

After the first processing unit 510 has determined the next processing unit and forwarded subsequent input signals from the input device 516, the next processing unit becomes the control processing unit. The control processing unit monitors the movement of a pointer on a display to which it is operatively coupled, and detects when the pointer is located in a transition area of that display. When this occurs, the control processing element searches the display map of FIG. 7 in a manner similar to that described above to determine the next processing unit.

Many entries shown in FIG. 7 have no value, or an "X" shown, for the next processing unit. In these instances, there is no next processing unit that will receive input signals of the input device 516 forwarded from the first processing unit 510 (i.e. the master processing unit). Because there is no next processing unit, the current control processing unit will maintain control of data received from the input device 516, and the pointer shown on the display will maintain its current position. As an example, the column index 708 (for a control Processing Unit$_2$) and the row index 716 (left transition area) have a next processing unit entry of "X," because there is no processing unit shown in FIG. 6 located to the left of the second processing unit 508. In this scenario, the second processing unit 508 will maintain control and continue to receive input signals from the input device 516.

In the embodiment shown in FIG. 7, the display map includes indexes by row and column. The display map is not, however, limited to row and column indexes. Other embodiments include indexes of different format. In addition, some embodiments include additional transition area indexes to those described above. In one embodiment, the display map includes transition area indexes for an upper-left transition area, an upper-right transition area, a lower-left transition area, and a lower-right transition area, corresponding to these transition areas on a display.

FIG. 8 is a detailed view of a display map for determining a next processing unit according to another embodiment of the invention. A display map 800 includes a plurality of control processing unit indexes, one or more display transition-area indexes, and one or more next processing unit entries that are each referenced by one of the control processing unit indexes and one of the display transition-area indexes. In this embodiment, columns are indexed by a processing unit 812, and rows are indexed by a transition area 814. The column indexes correspond to the processing unit having current control from the input device 516 (i.e. receiving current input signals from the input device 516). In this embodiment of the display map, however, there are fewer next processing unit entries having a value of "X." That is because the display map 800 implements a different technique of determining the next processing unit. The display map 800 implements a roll-over technique. For example, as shown in FIG. 6, there is no processing unit located physically above the second processing unit 508. However, a roll-over technique provides that the fourth processing unit 514 would receive subsequent control of input data from the input device 516 when the second processing unit 508 detects that a pointer on the second display 506 is located in a top transition area of the display. The column index 808 (Processing Unit$_2$) and the row index 820 (top transition area) of the display map 800 indicate that the fourth processing unit 514 (Processing Unit$_4$) is the next processing unit in this case. Similarly, if the fourth processing unit 514 has current control of the input device 516, and it detects that a pointer on the fourth display 518 is located in the bottom transition area, then control will be passed to the second processing unit 508, such that the second processing unit 508 will receive input signals of the input device 516 that are forwarded from the master processing unit (i.e. the first processing unit 510). The column index 804 (Processing Unit$_4$) and the row index 822 (bottom transition area) of the display map 800 indicate that the second processing unit 508 (Processing Unit$_2$) is the next processing unit.

FIG. 6 also shows that there is no processing unit located physically to the right of the third processing unit 502. A roll-over technique provides, however, that the fifth processing unit 520 would receive subsequent control of input data from the input device 516 when the third processing unit 502 detects that a pointer on the third display 504 is located in a right transition area of the display. The column index 806 (Processing Unit$_3$) and the row index 818 (right transition area) of the display map 800 indicate that the fifth processing unit 520 (Processing Unit$_5$) is the next processing unit in this case. Similarly, if the fifth processing unit 520 has current control of the input device 516, and it detects that a pointer on the fifth display 522 is located in the left transition area, then control will be passed to the third processing unit 502, such that the third processing unit 502 will receive input signals of the input device 516 that are forwarded from the master processing unit (i.e. the first processing unit 510). The column index 802 (Processing Unit$_5$) and the row index 816 (left transition area) indicate that the third processing unit 502 (Processing Unit$_3$) is the next processing unit.

Figure 9:
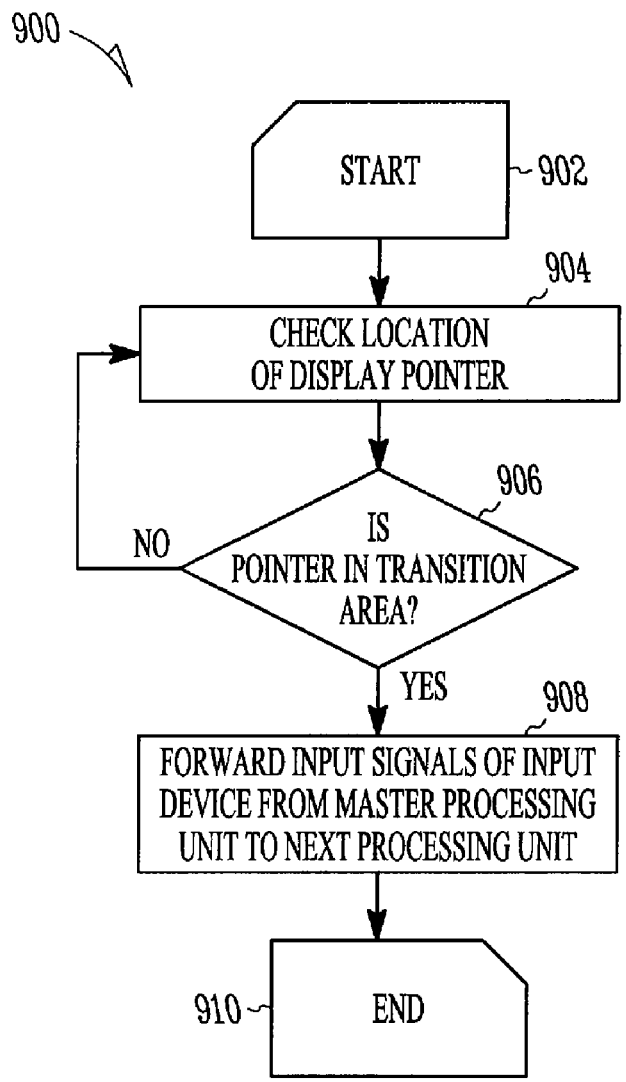
FIG. 9 is a high-level flow diagram that illustrates a method for forwarding input signals of an input device to a next processing unit according to one embodiment of the invention.

FIG. 9 is a high-level flow diagram that illustrates a method for forwarding input signals of an input device to a next processing unit according to one embodiment of the invention. A flow diagram 900 begins with a block 902, in which the method begins operation. The flow diagram 900 shows operation of a control processing unit that is currently receiving input signals from an input device operatively coupled to a master processing unit. The control processing unit processes these input signals and sends output signals to a display. The output signals control movement of a pointer on the display. The control processing unit may be the same as the master processing unit, but it need not be. In a block 904, the control processing unit checks the location of the pointer on the display. In a block 906, the control processing units checks if the pointer is located within a transition area of the display. If the pointer is not located within the transition area, then the control processing unit returns to the block 904, where it again checks the location of the pointer. If, however, the pointer is located within the transition area, then the master processing unit forwards one or more input signals of the input device to a next processing unit in a block 908. In one embodiment, the next processing unit is different from the control processing unit. The flow diagram 900 ends with a block 910.

In some embodiments, the control processing unit further determines an amount of time the pointer is located within the transition area. If the pointer is located within the transition area for a sufficient period of time, then the master processing unit will transfer processing of operations and forward subsequent input signals of the input device to the next processing unit. Otherwise, the master processing unit will not forward the input signals. The period of time in the transition area required as a prerequisite for forwarding input signals can be configured and later adjusted by a user. In one embodiment, the master processing unit will transfer input signals from the input device to the next processing unit if the pointer is located in a transition area for a predetermined amount of time. Embodiments of the invention are not limited to any particular amount of time. In one embodiment, the amount of time is set by the user and can be adjusted by the user as desired to any amount. In another embodiment, the amount of time is in a range from about ½ second to about 2 seconds.

In another embodiment, the method of the flow diagram 900 further includes configuring a master display map on the master processing unit, and transmitting a copy of the master display map from the master processing unit to one or more processing units that include the next processing unit and the control processing unit, and determining the next processing unit from an entry in the master display map. In another embodiment, the control processing unit searches the copy of the master display map to determine the next processing unit.

In another embodiment, the method of the flow diagram 900 further includes updating the master display map on the master processing unit, and transmitting an updated copy of the master display map from the master processing unit to the control processing unit, wherein the updating of the master display map is performed in response to a user-initiated request to change the master display map.

Figure 10:
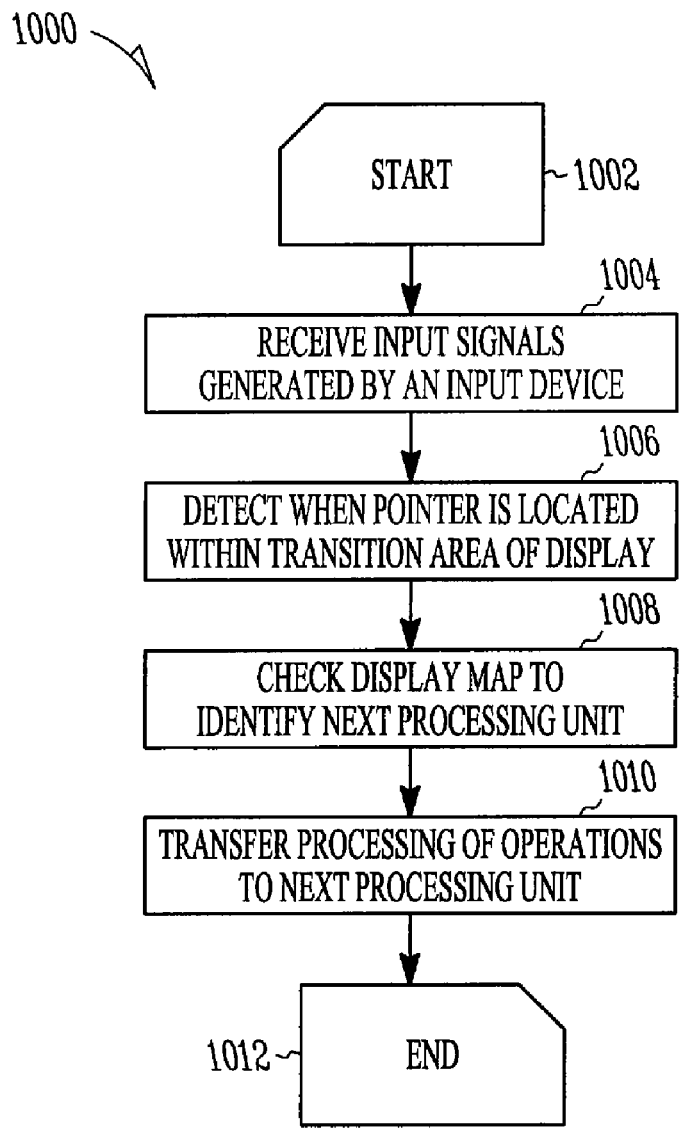
FIG. 10 is a high-level flow diagram that illustrates a method for checking a display map and transferring processing of operations to a next processing unit according to another embodiment of the invention.

FIG. 10 is a high-level flow diagram that illustrates a method for checking a display map and transferring processing of operations to a next processing unit according to another embodiment of the invention. In this embodiment, a machine-accessible medium (such as, for example, a mass storage device) includes machine-executable instructions stored thereon to perform the method illustrated in FIG. 10. A flow diagram 1000 begins with a block 1002. In a block 1004, a control processing unit receives one or more input signals generated by an input device, wherein the input device is coupled to a master processing unit. In some embodiments, the control processing unit is the same as the master processing unit. The one or more input signals generated by the input device control movement of a pointer on a display. In a block 1006, the control processing unit detects when the pointer is located within a transition area of the display. Upon such detection, the control processing unit checks a display map to identify a next processing unit to receive one or more subsequent input signals generated by the input device in block 1008. In a block 1010, the control processing unit transfers the processing of operations in response to the one or more subsequent input signals to the next processing unit. The flow diagram 1000 ends with a block 1012.

In some embodiments, the method of the flow diagram 1000 further includes transferring the one or more subsequent input signals generated by the input device to the next processing unit. In other embodiments, the method further includes determining an amount of time that the pointer is located within the transition area.

Figure 11:
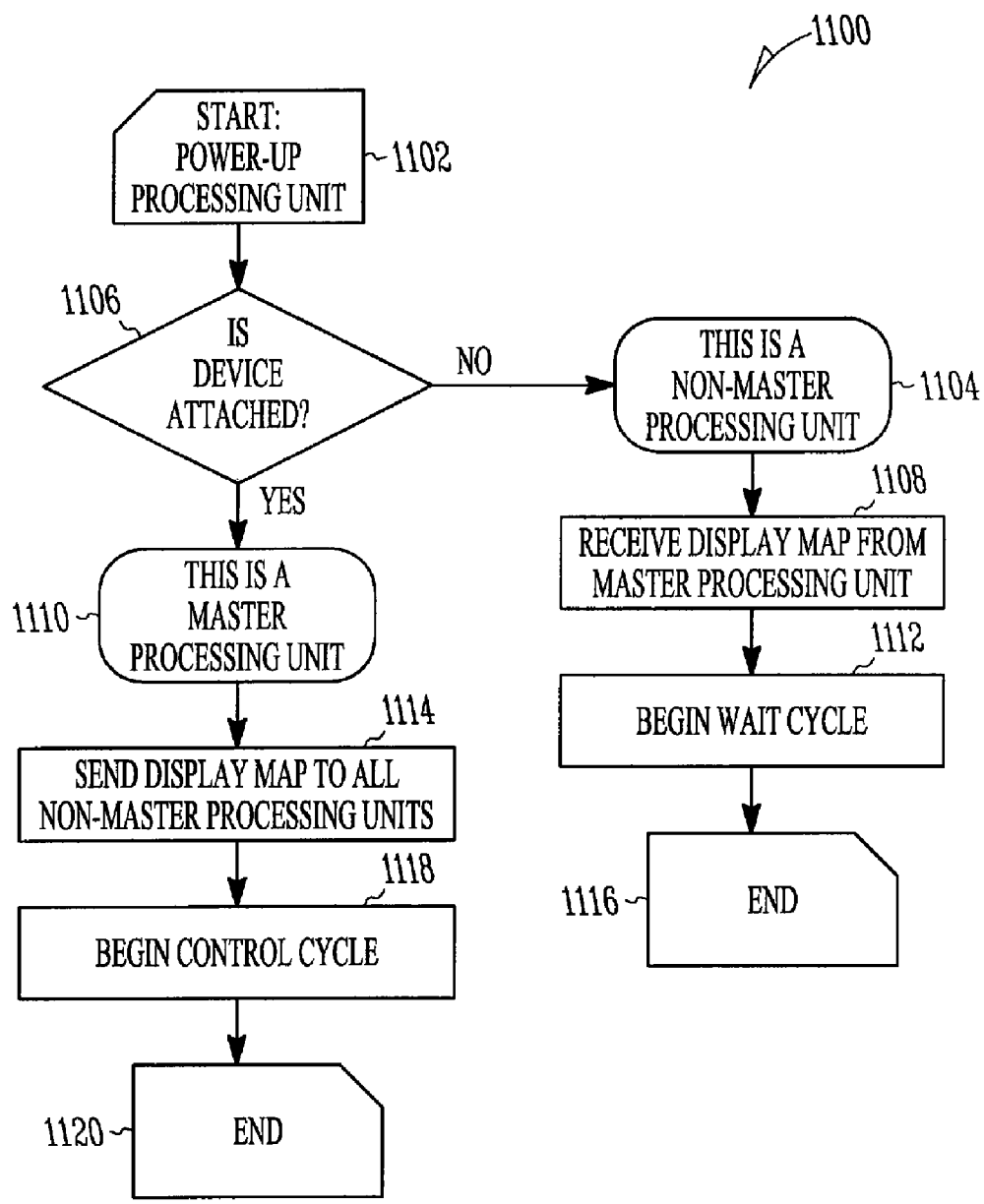
FIG. 11 is a flow diagram that illustrates a power-up cycle for a processing unit and display map initialization according to one embodiment of the invention.

FIG. 11 is a flow diagram that illustrates a power-up cycle for a processing unit and display map initialization according to one embodiment of the invention. A flow diagram 1100 begins with a block 1102, when the processing unit is powered up. In a block 1106, the processing unit checks to see if an input device is attached to it. If an input device is attached, then a self-discovery block 1110 indicates that the processing unit is a master processing unit (because a master processing unit is one that is operatively coupled to an input device). In a block 1114, the master processing unit sends a copy of a display map to all non-master processing units in the system. A block 1118 then begins a control cycle for the processing unit, as further described in FIG. 12. A block 1120 ends the flow for the master processing unit.

If an input device is not attached, then the self-discovery block 1104 indicates that the processing unit is a non-master processing unit. In a block 1108, the non-master processing unit receives the display map that is sent from the master processing unit. A block 1112 then begins a wait cycle for the non-master processing unit, as further described in FIG. 13. A block 1116 ends the flow for the non-master processing unit.

Figure 12:
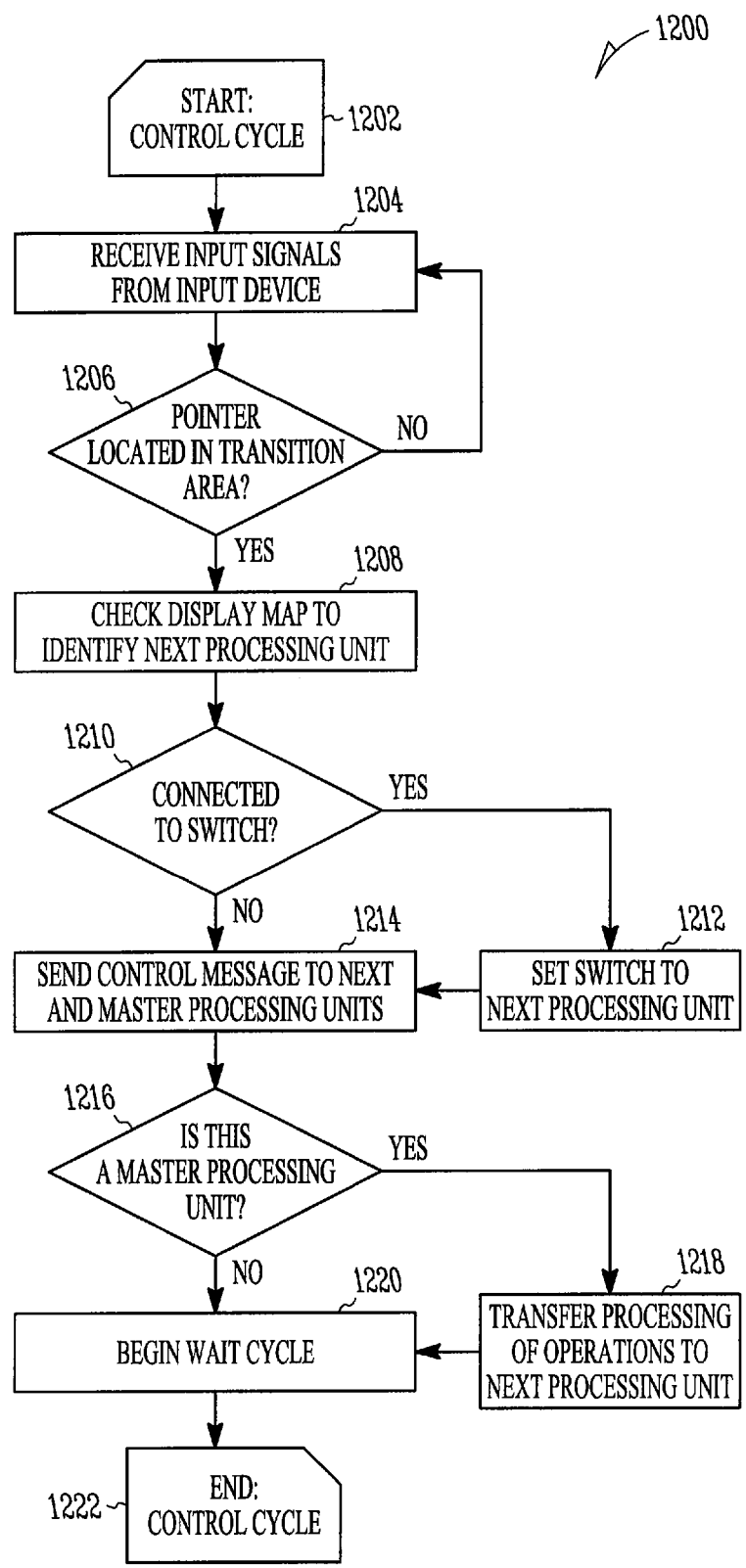
FIG. 12 is a flow diagram that illustrates a control cycle for transferring processing of operations to a next processing unit according to one embodiment of the invention.

FIG. 12 is a flow diagram that illustrates a control cycle for transferring processing of operations to a next processing unit according to one embodiment of the invention. A flow diagram 1200 describes the control cycle indicated in the block 1118 of FIG. 11. The flow diagram 1200 begins with the start of the control cycle in a block 1202 on a control processing unit. In a block 1204, the control processing unit receives input signals from the input device. In a block 1206, the control processing unit checks if a pointer controlled by movement of the input device is located in a display transition area. If not, then flow returns to the block 1204. If the pointer is located in a transition area, then the control processing unit consults its display map to identify the next processing unit in a block 1208. In a block 1210, the control processing unit checks if it is connected to a display switch. If it is, then it sets, or toggles, the switch to the next processing unit in a block 1212, so that output of the next processing unit will be sent to the display operatively coupled to the display switch. A block 1214 is performed after the block 1212. If the control processing unit is not connected to a display switch, the block 1214 is also then performed. In the block 1214, the control processing unit sends a control message to the next processing unit and the master processing units. The control message indicates that subsequent control of the input device is to be passed to the next processing unit. In a block 1216, the control processing unit checks if it is a master processing unit (i.e. if it is connected to the input device). If not, then the control processing unit begins a wait cycle in a block 1220 (further described in FIG. 13). If it is a master processing unit, then it transfers processing of operations to the next processing unit in a block 1218. After the block 1218, the master processing unit begins its wait cycle in the block 1220. A block 1222 ends the control cycle in the flow diagram 1200.

Figure 13:
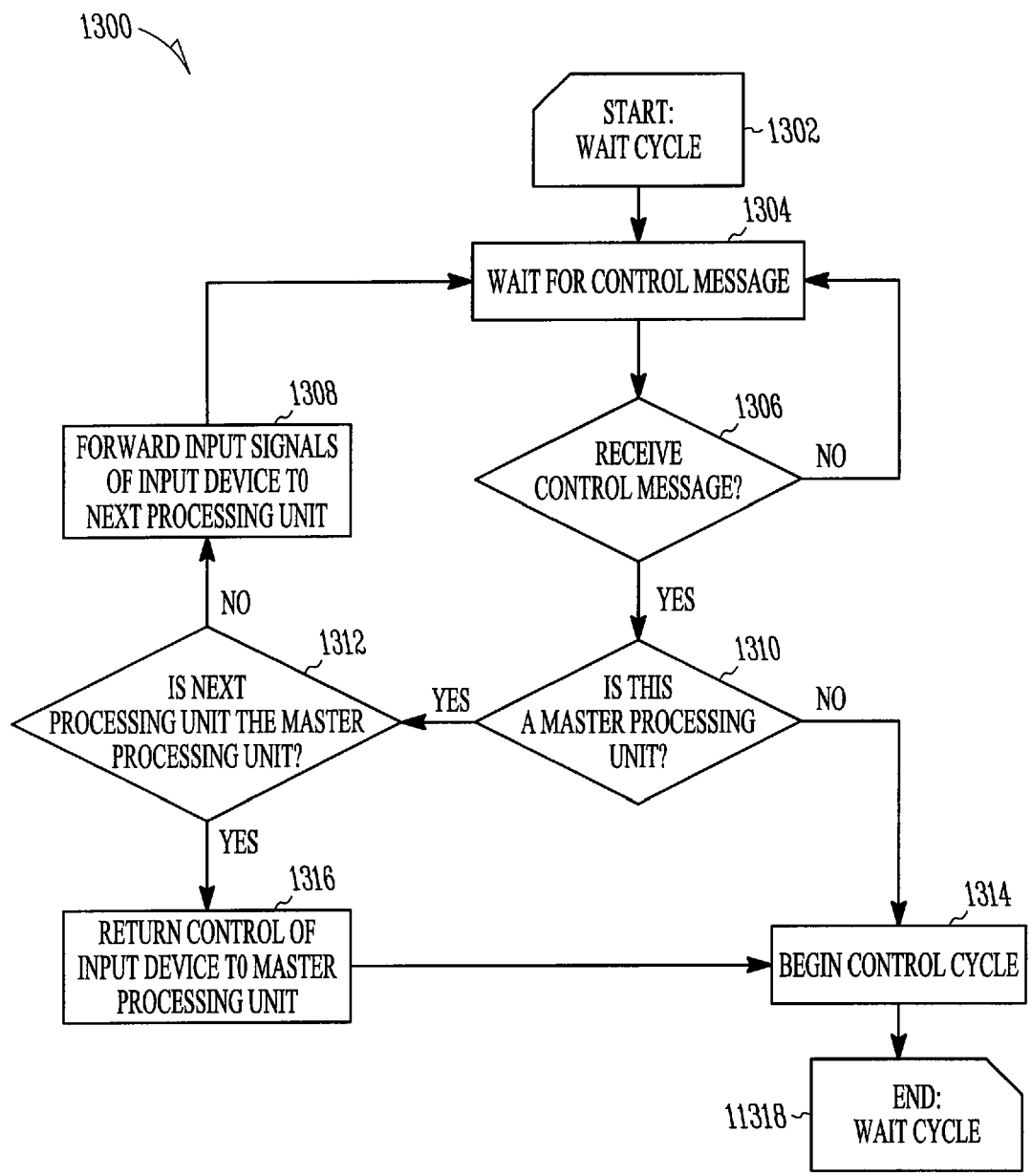
FIG. 13 is a flow diagram that illustrates a wait cycle according to one embodiment of the invention.

FIG. 13 is a flow diagram that illustrates a wait cycle according to one embodiment of the invention. A flow diagram 1300 describes the wait cycle indicated in the block 1112 of FIG. 11. The flow diagram 1300 begins with the start of the wait cycle in a block 1302. In a block 1304, the processing unit in the wait cycle waits for a control message from a control processing unit. In a block 1306, the processing unit checks if it has received a control message. If it has not, then it returns to the block 1304 in the flow diagram. If it has received a control message, the processing unit checks if it is a master processing unit in a block 1310 (i.e. if it is connected to an input device). If it is not, then the processing unit begins a control cycle in a block 1314. If it is a master processing unit, the master processing unit checks the control message to determine if the next processing unit (as indicated in the control message) is the same as the master processing unit in a block 1312. If it is, then the master processing unit returns control of the input device to the master processing unit in a block 1316, such that the master processing unit receives the input signals from the input device. The master processing unit then begins its control cycle in the block 1314. If the next processing unit is not the same as the master processing unit, then the master processing unit forwards the input signals from the input device to the next processing unit in a block 1308. In this scenario, a control processing unit has sent the master processing unit a control message only to inform the master processing unit of which next processing unit is to receive subsequent input signals from the input device. Master processing unit then returns to the block 1304 and waits for further control messages. A block 1318 ends the wait cycle in the flow diagram 1300.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the specific embodiments of the invention.

What is claimed is:

1. An apparatus comprising:
   a processor;
   a memory; and
   a machine-accessible medium having machine-executable instructions stored thereon, the machine-executable instructions to be executed by the processor from the memory to control two or more processing units from one input device, wherein signals from the one input device are selectively sent to one of the two or more processing units, and wherein when a pointer, under control by the one input device within a user interface, is moved to a transition area of a user interface of a first processing unit, the signals from the one input device are transferred to a second processing unit.

2. The apparatus of claim 1, further comprising two or more input/output devices to provide input signals to the processor.

3. The apparatus of claim 2, wherein the one or more input/output devices comprise a mouse.

4. The apparatus of claim 2, wherein the one or more input/output devices comprise a keyboard.

5. A system comprising:
a master processing unit;
a next processing unit operatively coupled to the master processing unit; and
an input device operatively coupled to the master processing unit, the input device to control the master processing unit and the next processing unit through signals selectively sent to one of the two processing units, wherein control may be switched between the master processing unit and the next processing unit, and wherein when a pointer, under control by the one input device within a user interface, is moved to a transition area of a user interface of the master processing unit, the signals from the one input device are transferred to the next processing unit.

6. The system of claim 5, further comprising a display coupled to the master processing unit, the display to present output from the master processing unit and the next processing unit.

7. The system of claim 6, further comprising a display switch operatively coupled to each of the master processing unit, the next processing unit, and the display, wherein the display switch is toggled when control is switched between the master processing unit and the next processing unit.

8. The system of claim 7, wherein the display switch is a hardware-based video switch.

9. The system of claim 5, further comprising:
a first display operatively coupled to the master processing unit, the first display to present output from the master processing unit; and
a second display operatively coupled to the next processing unit, the second display to present output from the next processing unit.

10. The system of claim 5, wherein the next processing unit is coupled to the master processing unit through a network.

11. The system of claim 10, wherein the network comprises an Ethernet network.

12. The system of claim 5, wherein the input device comprises a mouse.

13. The system of claim 12, wherein the input device further comprises a keyboard.

* * * * *

UNITED STATES PATENT AND TRADEMARK OFFICE
CERTIFICATE OF CORRECTION

| | |
|---|---|
| PATENT NO. | : 7,505,029 B2 |
| APPLICATION NO. | : 10/335193 |
| DATED | : March 17, 2009 |
| INVENTOR(S) | : MacPherson |

It is certified that error appears in the above-identified patent and that said Letters Patent is hereby corrected as shown below:

On the title page, item (54), in column 1, lines 1–3, delete "SYSTEM AND METHOD FOR CONTROLLING MULTIPLE PROCESSING UNITS WITH A SINGLE INPUT DEVICE" and insert -- APPARATUS AND SYSTEM FOR CONTROLLING MULTIPLE PROCESSING UNITS WITH A SINGLE INPUT DEVICE --, therefor.

In column 1, lines 1–3, delete "SYSTEM AND METHOD FOR CONTROLLING MULTIPLE PROCESSING UNITS WITH A SINGLE INPUT DEVICE" and insert -- APPARATUS AND SYSTEM FOR CONTROLLING MULTIPLE PROCESSING UNITS WITH A SINGLE INPUT DEVICE --, therefor.

Signed and Sealed this

Twelfth Day of May, 2009

JOHN DOLL
*Acting Director of the United States Patent and Trademark Office*